United States Patent
Seki et al.

(10) Patent No.: US 7,272,272 B2
(45) Date of Patent: Sep. 18, 2007

(54) OPTICAL DEFLECTOR BASED ON PHOTONIC BANDGAP STRUCTURE

(75) Inventors: Junichi Seki, Yokohama (JP); Takeaki Itsuji, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/527,526

(22) PCT Filed: Sep. 29, 2003

(86) PCT No.: PCT/JP03/12423

§ 371 (c)(1),
(2), (4) Date: Mar. 11, 2005

(87) PCT Pub. No.: WO2004/031820

PCT Pub. Date: Apr. 15, 2004

(65) Prior Publication Data

US 2006/0051009 A1    Mar. 9, 2006

(30) Foreign Application Priority Data

Oct. 1, 2002  (JP) .............................. 2002-288643

(51) Int. Cl.
G02F 1/295  (2006.01)
(52) U.S. Cl. .............................. 385/4; 385/16; 385/129
(58) Field of Classification Search .............. 385/1–8, 385/16, 129–133
See application file for complete search history.

(56) References Cited

U.S. PATENT DOCUMENTS

| | | | | |
|---|---|---|---|---|
| 6,064,506 A | | 5/2000 | Koops | 359/237 |
| 6,075,915 A | * | 6/2000 | Koops et al. | 385/125 |
| 6,188,819 B1 | | 2/2001 | Kosaka et al. | 385/39 |
| 6,448,997 B1 | | 9/2002 | Koide | 347/250 |
| 6,674,949 B2 | * | 1/2004 | Allan et al. | 385/129 |
| 6,684,686 B2 | | 2/2004 | Itsuji et al. | |
| 6,961,501 B2 | | 11/2005 | Matsuura et al. | 385/129 |
| 7,068,904 B2 | | 6/2006 | Itsuji et al. | 385/129 |
| 2002/0021878 A1 | * | 2/2002 | Allan et al. | 385/129 |
| 2002/0027696 A1 | | 3/2002 | Baba et al. | |

(Continued)

FOREIGN PATENT DOCUMENTS

EP   1 243 966 A2   9/2002

(Continued)

OTHER PUBLICATIONS

Kim, S., et al., "Strain-tunable Photonic Band Gap Crystals," Applied Physics Letters, American Inst. Of Physics, vol. 78, No. 20, May 14, 2001, pp. 3015-3017.

(Continued)

*Primary Examiner*—Frank G. Font
*Assistant Examiner*—Derek L. Dupuis
(74) *Attorney, Agent, or Firm*—Fitzpatrick, Cella, Harper & Scinto

(57) ABSTRACT

An optical deflector comprises a photonic crystal section, a light lead-in means for leading in light having a specific wavelength to the photonic crystal section and an external force application means for deforming the photonic crystal section by way of mechanical external force and changing the angle of refraction of the light led in by the light lead-in means in the photonic crystal section. Such an optical deflector has a compact configuration and operates at high speed.

4 Claims, 2 Drawing Sheets

U.S. PATENT DOCUMENTS

| | | | |
|---|---|---|---|
| 2002/0048422 A1* | 4/2002 | Cotteverte et al. | 385/4 |
| 2002/0135863 A1* | 9/2002 | Fukshima et al. | 359/298 |
| 2003/0231689 A1* | 12/2003 | Vurgaftman et al. | 372/96 |
| 2004/0057472 A1 | 3/2004 | Takiguchi et al. | 372/20 |

FOREIGN PATENT DOCUMENTS

| | | |
|---|---|---|
| EP | 1 329 758 | 7/2003 |
| JP | 10-253829 | 9/1998 |
| JP | 2000-66002 | 3/2000 |
| JP | 2001-13439 | 1/2001 |
| JP | 2001-042248 | 2/2001 |
| JP | 2001-91911 | 4/2001 |
| WO | WO 02/10843 * | 2/2002 |
| WO | WO 02/10843 A2 | 2/2002 |
| WO | WO 02/14913 A1 | 2/2002 |
| WO | WO 02/27383 A1 | 4/2002 |
| WO | WO 02/27384 A1 | 4/2002 |
| WO | WO 03/005119 A2 | 1/2003 |

OTHER PUBLICATIONS

Yablonovitch, "Inhibited Spontaneous Emission in Solid-State Physics and Electronics", Phys. Rev. Lett., vol. 58, No. 20, pp. 2059-2062 (1987).

* cited by examiner

OPTICAL DEFLECTOR BASED ON PHOTONIC BANDGAP STRUCTURE

TECHNICAL FIELD

The present invention relates to an optical deflector, an optical switch and an optical scanner as well as an optical deflection method.

BACKGROUND ART

"Photonic crystal" is an artificial novel crystal that has been proposed in recent years and is attracting attention ever since (E. Yablonovitch, Phys. Rev. Lett., 58 (1987) 2059-2062). It can be obtained by cyclically arranging substances having different refractive indexes at intervals substantially equal to the wavelength of light. Research and development efforts are being paid to produce optical elements out of such a crystal substance because it has peculiar optical characteristics including those of showing a forbidden band of light and having an apparently abnormal refractive index that are attributable to its so-called photonic band structure resembling to the band structure of a semiconductor and can be designed artificially in terms of structure and scale.

Of these optical characteristics a phenomenon referred to as super-prism effect may be worthy of paying attention. It is a phenomenon attributable to the apparently abnormal refractive index it has as pointed out above. More specifically, photonic crystal shows an angle of refraction several to several hundreds times greater than that of an ordinary prism made of optical glass.

As an application of the above-described phenomenon, a method of controlling the angle of deflection by changing the wavelength of the laser beam striking a photonic crystal has been proposed (Japanese Patent Application Laid-Open No. 2001-13439, U.S. Pat. No. 6,448,997). There has also been proposed a method of controlling the angle of deflection by shifting the angle of a photonic crystal by means of an actuator (Japanese Patent Application Laid-Open No. 2001-42248, U.S. Patent Application Publication No. 2002/027696).

However, a variable wavelength laser needs to be used as light source in order to change the wavelength of a laser beam but such a laser is generally expensive. Additionally, the use of such a laser is in principle not suitable for applications that require a constant wavelength. Furthermore, in order to shift the angle of a photonic crystal, it is necessary to use a large mechanism for shifting the entire crystal and such a mechanism is accompanied by a problem that the operation frequency lowers in use.

In view of the above-identified circumstances, it is therefore the object of the present invention to provide an optical deflector, an optical switch and an optical scanner having a compact configuration and adapted to operate at high speed as well as an optical deflection method.

DISCLOSURE OF THE INVENTION

The present invention provides an optical deflector, an optical switch and an optical scanner as well as an optical deflection method that have respective configurations as described below.

According to the invention, there is provided an optical deflector comprising a photonic crystal section, a light lead-in means for leading in light having a specific wavelength to the photonic crystal section and an external force application means for deforming the photonic crystal section by way of mechanical external force and changing the angle of refraction of the light led in by the light lead-in means in the photonic crystal section.

In another aspect of the invention, there is provided an optical switch or an optical scanner characterized in that it is realized by adding to an optical deflector as defined above a light lead-out means for leading out light deflected to a desired direction by an optical deflector.

In still another aspect of the invention, there is provided a light deflection method characterized by leading in light having a specific wavelength to a photonic crystal section, shifting the angle of refraction of the led in light in the photonic crystal section by applying mechanical external force to the photonic crystal section, thereby deflecting the led in light.

BEST MODE FOR CARRYING OUT THE INVENTION

In a mode of carrying out the invention, an actuator for applying mechanical external force is fitted to a photonic crystal that is formed by using a deformable material and, under a condition where a laser beam is made to strike the photonic crystal, the photonic crystal is deformed by using the actuator. As a result, the laser beam can be deflected by shifting the refractive angle without modulating the wavelength of the laser beam.

An optical switch can be realized by shifting the outgoing position of the laser bean transmitted through a photonic crystal by switching the angle of refraction so as to lead out the laser beam by way of a desired route.

An optical scanner can be realized by continuously shifting the outgoing angle of the laser beam transmitted through a photonic crystal by shifting the angle of refraction so as to lead out the laser beam directing a desired angle.

The angle of refraction varies depending on the period of a photonic crystal. Alternatively, the angle of refraction can be changed by changing the distribution of refractive index in a period while fixing the period.

With an arrangement for directly deforming a photonic crystal in a manner as described above, it is possible to realize a compact configuration and a high-speed operation.

Thus, according to the invention, there is provided an optical deflector, an optical switch and an optical scanner having a compact configuration and adapted to operate at high speed as well as an optical deflection method.

Now, the present invention will be described in greater detail by referring to the accompanying drawings that illustrate preferred embodiments of the present invention.

EMBODIMENT 1

Figure 1:
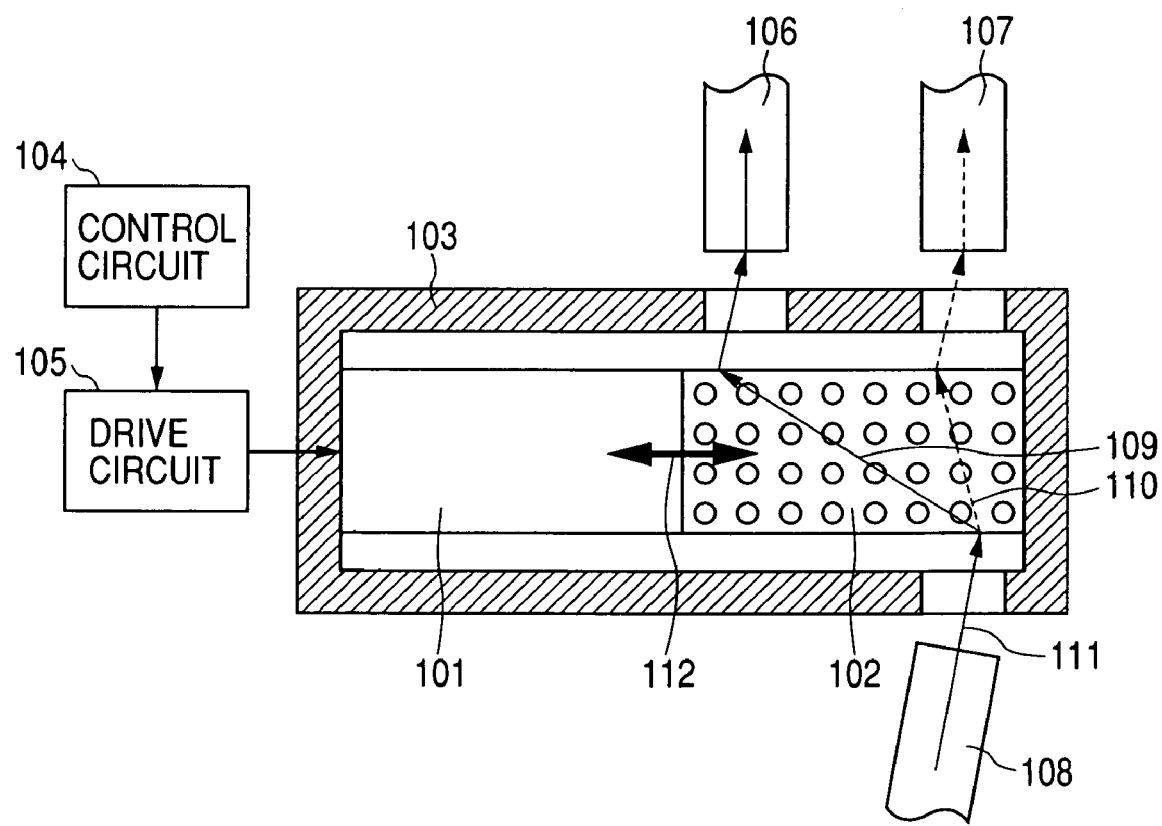
FIG. 1 is a schematic illustration of the embodiment 1 of the invention, which is an optical switch, showing its configuration.

FIG. 1 is a schematic illustration of the embodiment 1 of the invention, which is an optical switch, showing its configuration.

Referring to FIG. 1, an actuator 101 formed by a piezoelectric element and a photonic crystal 102 of PMMA (polymethylmethacrylate) are connected to each other and contained in a cabinet 103. The photonic crystal 102 is formed by boring through holes through a plate-shaped piece of PMMA. The through holes are formed by X-ray lithography.

In this embodiment, a force is applied to the photonic crystal in the direction of period to mechanically deform the crystal, whereby the period and thus the refractive index are changed.

The actuator 101 operates to expand and compress the photonic crystal 102 in respective directions indicated by a double-headed arrow 112. The cabinet 103 is provided with three holes arranged at a pair of opposite sides of the photonic crystal 102 in order to secure a light path through the photonic crystal 102. An optical fiber is fitted to each of the holes to lead in or lead out a laser beam through it. The first and second optical fibers 106, 107 are arranged at a side opposite to the third optical fiber 108 with the photonic crystal 102 disposed between them.

A control circuit 104 is adapted to feed a control quantity to drive circuit 105, which drives the actuator 101.

Incident light 111 that comes in through the third optical fiber 108 is transmitted through the photonic crystal 102 by way of the first optical path 109 or the second optical path 110 depending on the control quantity output from the control circuit 104 and enters the first optical fiber 106 or the second optical fiber 107.

The photonic crystal 102 is formed by boring through holes through a plate-shaped piece of PMMA, which is a continuous entity, in the above description. However, the structure of the photonic crystal is not limited thereto and a cyclic structure formed by regularly and perpendicularly standing pillar-shaped members on a substrate may alternatively be used. If such a structure is used, the substrate is horizontally expanded and compressed by means of the actuator so as to indirectly change the cyclicity of the pillar-shaped members. The actuator and the cabinet may become unnecessary when the substrate is formed by a piezoelectric substance so that the substrate itself may expand and compress.

The material of the photonic crystal 102 is not limited to the above-described one. More specifically, it may be selected from candidate materials by taking physical properties such as refractive index and Young's modulus, process-adaptability in the manufacturing process, adaptability to the operating environment including temperature and humidity into consideration.

Additionally, while a piezoelectric element is used as actuator 101 in this embodiment, some other drive mechanism such as a feed screw mechanism or a voice coil may alternatively be used.

EMBODIMENT 2

Figure 2:
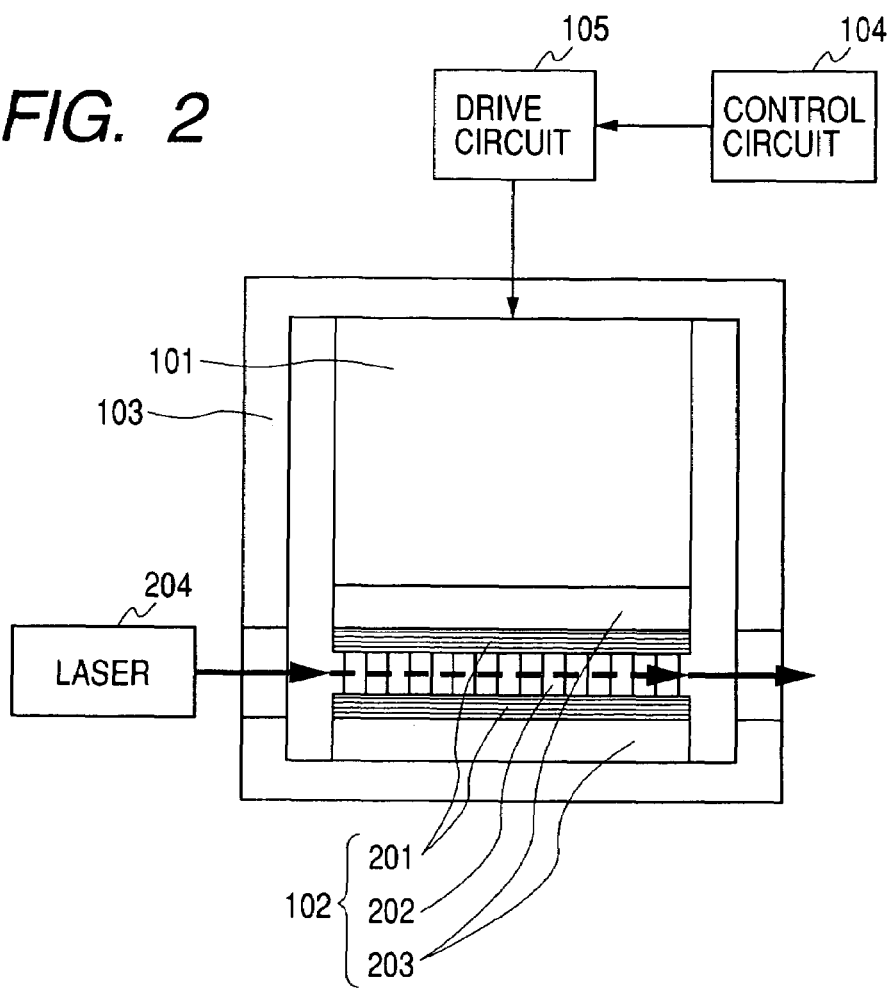
FIG. 2 is a schematic illustration of the embodiment 2 of the invention, which is also an optical switch, showing its configuration.

FIG. 2 is a schematic illustration of the embodiment 2 of the invention, which is also an optical scanner, showing its configuration.

Referring to FIG. 2, an actuator 101 formed by using a piezoelectric element and a photonic crystal 102 are put together and contained in a cabinet 103. As shown in FIG. 2, the photonic crystal 102 is formed by sandwiching a cyclic structure 202 comprising deformable pillar-shaped independent members between a pair of substrates 203 arranged in parallel with each other so as to make the pillar-shaped members stand perpendicularly relative to the substrates 203.

In this embodiment, while the period of the photonic crystal is fixed, the distribution of refractive index in a period and thus the angle of refraction are shifted continuously so that the direction of deflection is continuously variable. Hence, an optical scanner is realized.

The actuator 101 operates to expand and compress the photonic crystal 102 in the opposite directions of the normal to the surfaces of the substrates 203. The cabinet 103 is provided with two holes arranged at a pair of opposite sides of the photonic crystal 102 in order to secure a light path through the photonic crystal 102. A laser beam that comes from a laser 204 and enters the element through one of the holes is transmitted through the photonic crystal 102 and goes out through the other hole that is wide in the scanning direction. A control circuit 104 computationally determines a control quantity in such a way that the laser beam is deflected by a desired angle before it goes out and feeds it to the drive circuit 105, which drives actuator 101.

The photonic crystal 102 may typically be prepared in a manner as described below. Firstly, a multilayer film is formed on a substrate 203 that is made of Si to produce a reflection film 201. Then, PMMA (polymethylmethacrylate) is applied onto the reflection film 201 and a cyclic structure 202 is formed by X-ray lithography. Each of the pillar-shaped members of the cyclic structure 202 is isolated and a two-dimensional cyclic structure is formed on the surface plane of the reflection film 201 that is parallel to the surface of the substrate 203.

Figure 3:
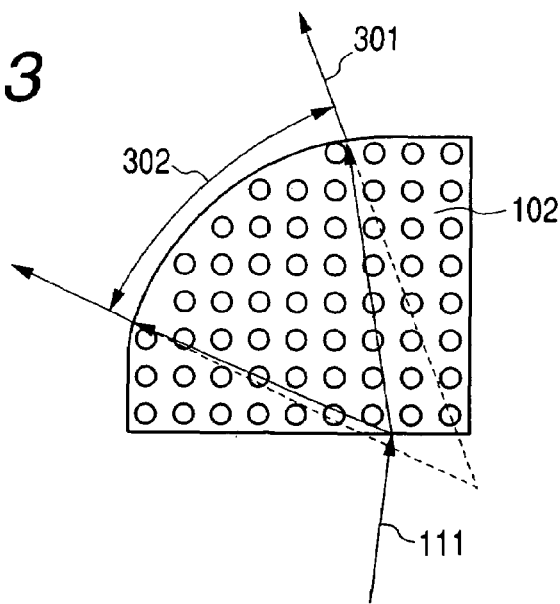
FIG. 3 is a schematic illustration of the photonic crystal used in the embodiment 2, showing its configuration.

Then, another substrate 203, which is made of Si and on which a reflection film 201 is formed, is prepared and the two substrates 203 are put together with the reflection films 201 facing the cyclic structure 202 of PMMA. The end facet through which light goes out is processed by grinding to show an arc-shaped profile as illustrated in FIG. 3. Note that FIG. 3 is a view as seen along the normal to the substrates 203.

As external force is applied to the photonic crystal 102 prepared in a manner as described above along the normal to the substrates 203. A drive circuit 105 is controlled by a control circuit such that a continuous voltage is applied to the actuator, As a result, the actuator deforms the cyclic structure by causing a continuous expansion/contraction thereof. Each of the pillar-shaped members of the cyclic structure 102 is deformed to change continuously its diameter so that the angle of refraction of the photonic crystal 102 can be shifted under control. Therefore, incident light 111 that comes into the photonic crystal 102 from the laser 204 is refracted by an angle according to the quantity of deformation given by the control circuit 104 and then transmitted through the photonic crystal 102 so that the outgoing beam of light 301 scans within an angle as indicated by deflecting range 302 in FIG. 3.

The materials of the reflection films 201, the cyclic structure 202, the substrates 203 and so on are not limited to those described above. More specifically, they may be selected from candidate materials by taking physical properties such as refractive index and Young's modulus, process-adaptability in the manufacturing process, adaptability to the operating environment including temperature and humidity into consideration.

Additionally, while a piezoelectric element is used as actuator 101 in this embodiment, some other drive mechanism such as a feed screw mechanism or a voice coil may alternatively be used.

The invention claimed is:

1. An optical deflector comprising:

a photonic crystal section comprising a material having through holes;

light lead-in means for leading in light to said photonic crystal section; and external force application means for deforming said photonic crystal section by way of mechanical external force and changing the angle of refraction of the light led in by said light lead-in means in said photonic crystal section, wherein said external force application means is adapted to apply mechanical external force to said photonic crystal section in a direction parallel to the direction of axes of the through holes forming a cyclic structure of said photonic crystal section so as to shift the angle of refraction in said photonic crystal section.

2. An optical switch comprising an optical deflector according to claim 1 and a light lead-out means for leading out light deflected to a desired direction by said optical deflector.

3. An optical scanner comprising an optical deflector according to claim 1.

4. An optical deflector comprising:

a photonic crystal section comprising a material having through holes;

a light lead-in portion for leading in light to said photonic crystal section; and external force application means for deforming said photonic crystal section by way of mechanical external force and changing the angle of refraction of the light led in by said light lead-in portion in said photonic crystal section, wherein said external force application means is adapted to apply mechanical external force to said photonic crystal section in a direction parallel to the direction of axes of the through holes forming a cyclic structure of said photonic crystal section so as to shift the angle of refraction in said photonic crystal section.

* * * * *

UNITED STATES PATENT AND TRADEMARK OFFICE
CERTIFICATE OF CORRECTION

PATENT NO. : 7,272,272 B2
APPLICATION NO. : 10/527526
DATED : September 18, 2007
INVENTOR(S) : Seki et al.

It is certified that error appears in the above-identified patent and that said Letters Patent is hereby corrected as shown below:

Title Page; item (75);
INVENTORS:
"Takeaki Itsuji, Kanagawa-ken (JP)" should read --Takeaki Itsuji, Hiratsuka-shi (JP)--.

COLUMN 4:
Line 44, "actuator," should read --actuator.--.

Signed and Sealed this

Tenth Day of February, 2009

JOHN DOLL
*Acting Director of the United States Patent and Trademark Office*